US005540806A

United States Patent [19]

Traise

[11] Patent Number: 5,540,806

[45] Date of Patent: Jul. 30, 1996

[54] TABLETOP PRESSURE SEALER

[75] Inventor: John E. Traise, Niagara Falls, N.Y.

[73] Assignee: Moore Business Forms, Inc., Grand Island, N.Y.

[21] Appl. No.: 605,797

[22] Filed: Oct. 31, 1990

[51] Int. Cl.[6] .......... B32B 31/00

[52] U.S. Cl. .......... 156/555; 156/290; 156/292; 156/441.5; 493/264

[58] Field of Search .......... 156/290, 291, 156/292, 553, 554, 555, 556, 550, 583.1, 583.5, 582, 441.5; 100/171, 93 RP; 493/210, 264, 266

[56] References Cited

U.S. PATENT DOCUMENTS

| | | | |
|---|---|---|---|
| 426,728 | 1/1890 | Maret . | |
| 891,701 | 6/1908 | Jennings . | |
| 2,381,054 | 10/1943 | Shively | 154/42 |
| 2,893,468 | 7/1959 | Fieroh | 154/42 |
| 2,944,587 | 7/1960 | Newcomb | 156/550 |
| 3,163,352 | 12/1964 | Fesco | 493/210 X |
| 3,770,550 | 11/1973 | Levitan | 156/583.1 X |
| 4,343,129 | 8/1982 | Gunther, Jr. et al. | 53/206 |
| 4,426,035 | 1/1984 | Dieckow | 206/526 |
| 4,450,037 | 5/1984 | Gavronsky | 156/441.5 |
| 4,451,320 | 5/1984 | Marvel | 156/555 X |
| 4,721,501 | 1/1988 | Herrington | 493/193 |
| 4,721,502 | 1/1988 | Herrington | 493/193 |
| 4,926,787 | 5/1990 | Fassman et al. | 118/32 |
| 5,019,203 | 5/1991 | Singer | 156/555 X |

*Primary Examiner*—James Engel
*Attorney, Agent, or Firm*—Nixon & Vanderhye

[57] ABSTRACT

A pressure sealer for sealing pressure sensitive adhesive strips on business forms or the like is simple and straight forward, for use primarily in manual operations. First and second driven rollers convey business forms during sealing, and are driven by a single motor driven gear meshing with Delrin gears integral with the rollers. Pressure applying rollers are mounted above and in alignment with first and second rollers, and are biased by an adjustable spring mechanism to provide the necessary pressure to effect sealing. The spring force applying mechanism can also be disabled so that no force is applied to allow ready inspection and/or replacement of the components, by utilizing a particular procedure including replacing one bolt with a longer thinner bolt. Pinching of the operator's fingers is prevented by a flap disposed in association with a lead-in platform for the forms, just prior to the rollers. The second roller in the direction of form conveyance may a slightly larger diameter than the first roller to effect pull-up of a document feeding from the first roller to the second roller.

22 Claims, 3 Drawing Sheets

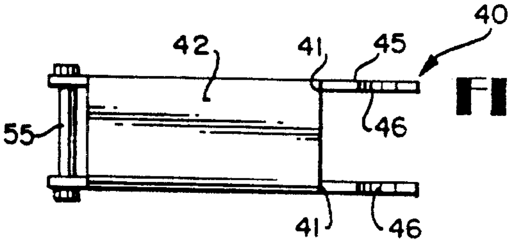
FIG. 7
FIG. 5
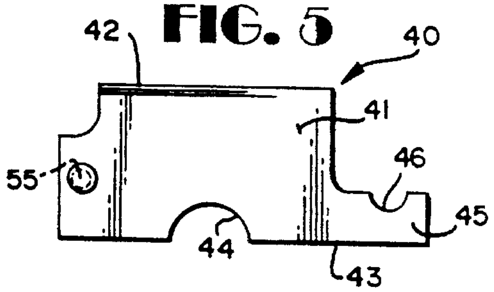
FIG. 6
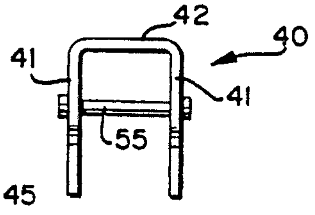
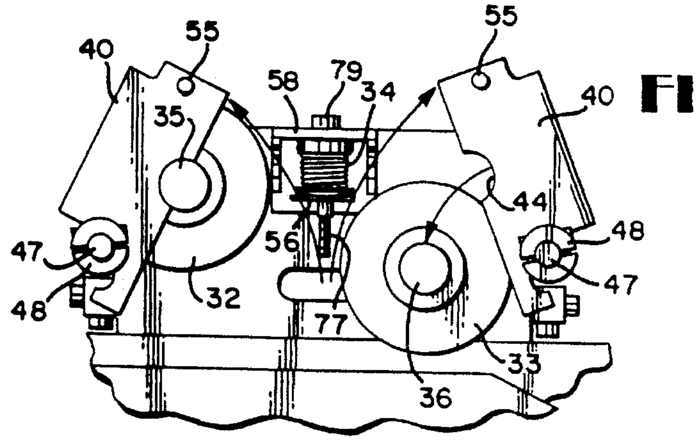
FIG. 8
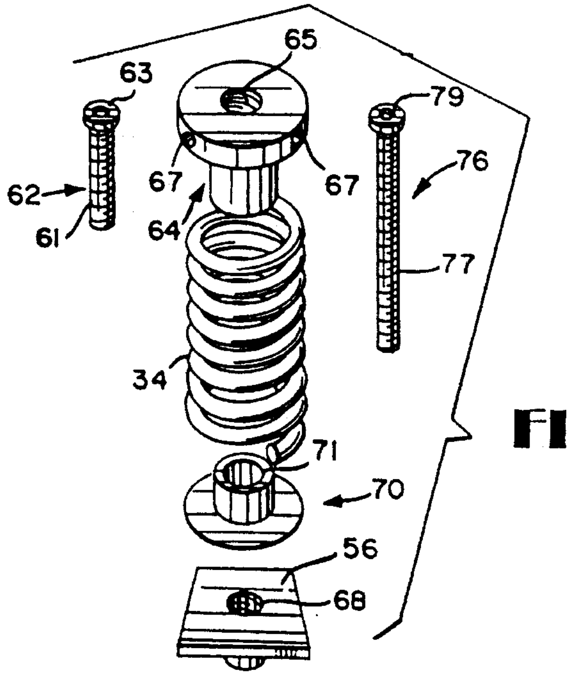
FIG. 10
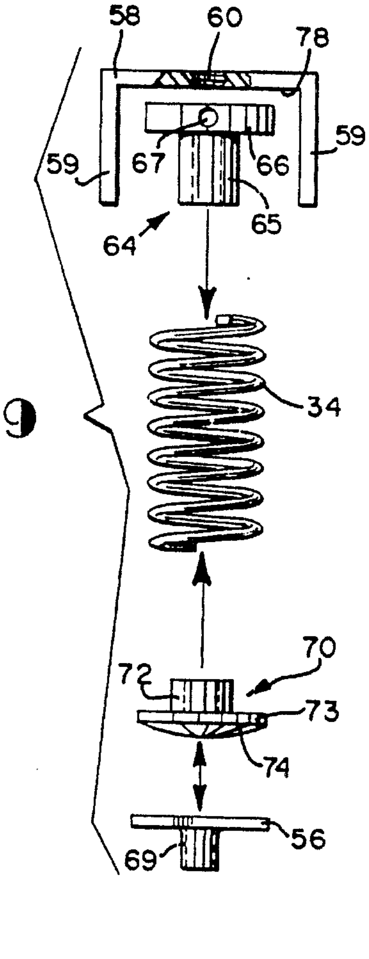
FIG. 9

TABLETOP PRESSURE SEALER

BACKGROUND AND SUMMARY OF THE INVENTION

In copending application Ser. No. 07/417,775, filed Oct. 6, 1989 (the disclosure of which is hereby incorporated by reference herein), a method and apparatus are provided for essentially automatic sealing of business forms using pressure sensitive adhesive rather than heat activated adhesive. The method and apparatus disclosed in that patent application are very effective and have broad applicability. However, that procedure is slightly more complex than necessary for some uses, and may handle the business forms (documents) in a somewhat undesirable manner under other circumstances.

According to the present invention, an extremely simple, inexpensive, and straight forward pressure sealer is provided which is designed to handle business forms on a manual feed or semi-manual feed basis. When utilizing the apparatus of the above mentioned patent application, due to a jam or paper misfeed some of the documents may not make it all the way through the sealer. It is impractical to feed those documents through again; however, utilizing the machine according to the invention, those documents can be manually run through to be sealed in a very simple yet effective manner. Also, there are some documents that require special processing due to data sensitivity or other special handling requirements, and those documents are best hand fed rather than acted upon automatically. Further, if there is a need merely to seal a very few documents, either to finish out a batch, or for an odd mailing in a small business, or the like, the simple, easy to use machine according to the invention is highly desirable.

According to one aspect of the present invention, a basic manual feed pressure sealer is provided for sealing adhesive strips of pressure sensitive adhesive associated with business forms. The apparatus comprises the following elements: A frame. Conveying means for conveying a business form past the frame, the conveying means consisting essentially of a first narrow width roller rotatable about a first horizontal axis, a second narrow width roller rotatable about a second horizontal axis, a drive motor, and gearing means interconnecting the drive motor to the first and second rollers. And, pressure applying means for applying pressure to the business forms when being conveyed in a first direction along a line tangent to both the first and second rollers, the pressure applying means comprising third and fourth narrow width rollers rotatable about third and fourth axes parallel to and aligned with the first and second axes, respectively, and means for biasing the third and fourth rollers toward contact with the first and second rollers so that as a business form is conveyed by the first and second rollers pressure is applied thereto by the third and fourth rollers. The gearing means preferably comprises only three gears, made of Delrin or like plastic, a pinion gear driven by the motor, and meshing with two other gears, one integral with each of the first and second rollers. The third and fourth rollers preferably comprise sections of ball bearings. The frame includes a platform leading to the first roller, and has a flap to prevent pinching of the operator's fingers. Spring pressure is applied to the third and fourth rollers with a mechanism that provides adjustment of the spring pressure, or can be completely disabled to release all spring pressure and allow easy inspection and/or replacement of the components.

The spring pressure applying means comprises: a stationary flange mounted on the frame and having a screw threaded opening therein of a first diameter; a spring pressure adjusting collar having a screw threaded opening therein of the first diameter; a coil spring; and a spring positioning plate. The spring pressure adjusting collar is disposed on the underside of the flange with the screw threaded openings therein in alignment; the spring engaging the adjusting collar at one end thereof, and operatively engaging the plate at the other end thereof. A first bolt has external screws with the first diameter and has a length less than the length from the flange to the plate when the spring is in extended position, the spring biasing the plate into operative engagement with the third and fourth rollers to apply a spring pressure thereto. Also, the spring positioning plate has a screw threaded opening therein having a second diameter, smaller than the first diameter; and wherein the spring biasing means further comprises a second bolt, interchangeable with the first bolt, and having external threads thereon of the second diameter, and having a length greater than the length from the flange to the plate when the spring is in extended position.

Desirably, roller yokes are provided for the third and fourth rollers, each roller yoke operatively attaching a roller to the frame for rotation about its axis and for relative movement toward and away from the first and second rollers. Each roller yoke has means for engaging the spring positioning plate so that the bias of the coil spring is applied to the third and fourth rollers through the spring positioning plate and the roller yokes. Each of the roller yokes is releasably pivotally mounted to the frame about its own yoke axis so that when the second bolt is fully threaded into the spring positioning plate the spring is compressed so that the roller yoke may be pivoted about its yoke axis and disconnected from the frame, but when the first bolt is in operative association with the flange the pressure of the spring prevents the yokes from being significantly pivotally movable about the yoke axes.

The biasing means also preferably comprises a spring button having a through extending opening therein large enough to allow clear passage of the second bolt therethrough, a spring positioning central post, and a rounded head engaging the spring positioning plate. The coil spring engages the head on the opposite side thereof from the plate, and surrounds the post, and operatively engages the spring positioning plate through the head.

The invention also contemplates a method of handling business forms. The method comprises the steps of: (a) manually feeding a business form into operative association with the rollers so that the rollers apply pressure to one of the plurality of pressure sensitive adhesive strips to seal the business form together at that strip; and (b) after step (a), repeating manually moving the business form into operative association with each of the other unsealed adhesive strips, in turn, until all desired adhesive strips of the business form have been sealed. The force being applied by the rollers is only applied to the approximate area of the predetermined width of adhesive of each strip.

It is a primary object of the present invention to provide a simple and effective method and apparatus for pressure sealing of business forms. This and other objects of the invention will become clear from an inspection of the detailed description of the invention, and from the appended claims.

BRIEF DESCRIPTION OF THE DRAWINGS

FIG. 5 is a side view of an exemplary yoke for mounting an upper roller of a machine of FIGS. 1 through 4;

FIGS. 6 and 7 are front and top plan views, respectively, of the yoke of FIG. 5;

FIG. 8 is a front detail view showing the movement of the yokes about pivot axes to allow disconnection of the upper rollers for replacement or maintenance; FIG. 9 is a front exploded view of the spring biasing components of the machine of FIG. 1 through 8; and FIG. 10 is a perspective exploded view of the spring biasing components.

DETAILED DESCRIPTION OF THE DRAWINGS

Figure 1:
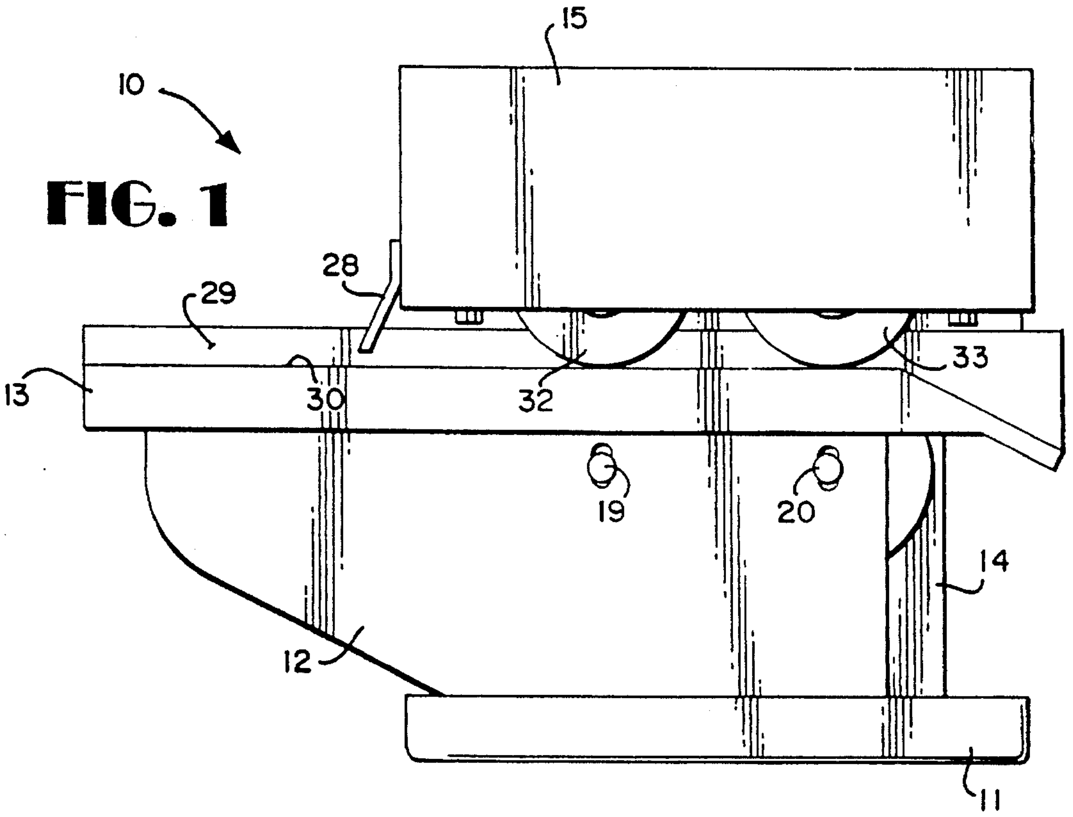
FIG. 1 is a front view of an exemplary pressure sealer according to the invention.

An exemplary pressure applying apparatus for applying pressure to business forms to activate pressure sensitive adhesive associated with the forms to seal one part of the form to another, is illustrated generally by reference numeral 10 in FIGS. 1 through 4. The apparatus 10 is adapted to be mounted on a "table top", being small in size, simple in construction, and readily transportable from place to place. It is designed primarily for manual, or semi-manual, operation, effecting proper pressure sealing of adhesive strips utilizing the same basic force applicating procedure as is disclosed in co-pending application Ser. No. 07/417,775 filed Oct. 6, 1989 (and the disclosure of which has been incorporated by reference herein).

One of the basic elements of the machine 10 comprises a frame. The frame is formed of several different components, and for the exemplary embodiment illustrated in the drawings includes a base 11, a folded metal sheet 12, a lead in platform 13, a main support 14, and a safety and cosmetic outer enclosure 15. The frame components typically are made of metal.

The apparatus 10 also comprises conveying means for conveying a business form past the frame 11–15. The conveying means preferably consists of only two narrow width (e.g. having a peripheral surface width of less than about an inch, typically about one-half inch) rollers, namely first roller 17 and second roller 18. The rollers are mounted by shaft pins 19, 20 respectively—which are received by both of the frame components 12, 14—for rotation about parallel horizontal axes. The conveying means further comprises a drive motor 21 (FIGS. 3 and 4), typically an electric motor (cord and plug not shown) that is operated by a 120 volt AC current and has an integral gear reducing box associated therewith. The conveying means further comprises gearing means interconnecting the drive motor 21 to the rollers 17, 18 to effect rotation thereof about the axes defined by their shafts 19, 20. Preferably the gearing means consists of just three gears, a drive gear 22 connected to the output shaft 23 from the gear reducer associated with the motor 21, and a gear integral with each roller 17, 18, and mounted on the shafts 19, 20, respectively, such as the gear 25 shown in FIG. 3 mounted to the shaft 20 behind second roller 18, the first roller 17 having a comparable gear 24 (shown in dotted line in FIG. 2).

It is preferred that the gears 22, 24, 25, be made of Delrin, or other non-ferrous metals or plastic composites having strength, lubricity, and manufacturability properties suitable for this application. Also, preferably the second roller 18 has a diameter enough larger than the diameter of the first roller 17 to effect pull up of a business forms feeding from the first roller 17 to the second roller 18 (e.g. a diameter several hundredths of an inch larger).

A business form is placed on the lead in platform 13 and is moved in the direction of arrow 27 toward the roller 17. In order to prevent the operator from moving his or her fingers into the dangerous high pressure area at roller 17, a safety flap is provided. The safety flap—such as a flap of leather or plastic material—is illustrated schematically in FIGS. 1 and 2 by reference numeral 28, and may be mounted either on the cosmetic housing 15, or the portion 29 of the platform component 13, upstanding from the lead in surface 30 to the roller 17.

The machine 10 also comprises pressure applying means for applying pressure to the business forms when being conveyed in the direction 27 along the platform surface 30 tangent to the upper surfaces of both rollers 17, 18. The pressure applying means comprises third and fourth rollers 32, 33, respectively, which are biased—preferably by coil spring 34—into engagement with the top surfaces of the rollers 17, 18. The rollers 32, 33 also have a narrow width, approximately the same as that of the rollers 17, 18. Note that the third and fourth rollers 32, 33 are rotatable about axes defined by shaft stubs 35, 36, which axes are parallel to the axes defined by shafts 19, 20, and are preferably vertically in alignment therewith. Each roller 32, 33 may comprise a standard ball bearing, if desired.

The spring bias provided by the coil spring 34 preferably is adjustable to vary the amount of pressure applied by the rollers 32, 33 to the form adhesive strip passing between the rollers 17, 32 and the rollers 18, 33.

In order to provide for effective mounting of the rollers 32, 33 so that the spring pressure applied thereto can be adjusted, and so that despite the application of constant spring pressure the rollers 32, 33 may be disconnected from the rest of the apparatus 10 for replacement or maintenance of the entire unit, roller mounting yokes 40—seen most clearly in use in FIGS. 2 through 4 and 8, and in isolation in FIGS. 5 through 6—are provided. Each yoke 40 is preferably formed by a single piece of metal which is bent into a contoured channel configuration having side walls 41, a top wall 42, and an open bottom. The edges 43 defining the bottom include semi-circular recesses 44 therein for a loose receipt of the shaft associated with the third or the fourth roller (e.g. either shaft 35 or 36) to provide a bearing surface for the shaft, a semi-circular opening 44 engaging a portion of the shaft on either side of the roller 32, 33.

The yoke 40 also includes an extension 45 having an upwardly facing semi-circular openings 46 therein which are adapted to engage a shaft 47 (see FIGS. 2, 3, and 8 in particular) which defines a pivot axis for the yoke 40, and thus allowing relative movement between the rollers 17, 32 and 18, 33 against the pressure of the spring 34. The axis of rotation defined by the shafts 47 are horizontally spaced from the axes defined by the shafts 35, 36. A collar 48 is preferably mounted on the free end of each shaft 47 to prevent movement of the yoke 40 off the shaft 47 in the direction of elongation thereof. Preferably, the shafts 47 are themselves mounted for ready detachment from the frame component 14, as by removing the block 49 (see FIG. 3) mounting each shaft 47. Note that the block 49 may be adjustable up and down with respect to the frame 14 by Allen screws 50 movable in elongated slots 51 when loosened, and holding the block 49 against the frame 14 when the desired position is reached. Also, the block 49 may be completely detached from the apparatus 10 by unscrewing Allen screws 52.

Spring pressure from coil spring 34 is actually applied to the yokes 40—and thus to the third and fourth rollers 32, 33—by the pin 55 associated with each yoke 40, and extending between the side walls 41 thereof opposite the pivot engaging semi-circle 46. The pressure of the spring 34 is transmitted to the pins 55 through a spring positioning plate 56, seen in FIGS. 8 through 10.

The components of the spring biasing force application structure are illustrated most clearly in FIGS. 8 through 10. They include a flange 58 which is welded or otherwise stationarily mounted to the frame component 14 adjacent the top thereof, and has support portions 59. As seen in FIG. 9, the flange 58 has a through-extending screw threaded opening 60 therein, which has a first diameter. That diameter is the same as the diameter of the external screw threads 61 on a first bolt 62 having a head 63.

Another component of the spring pressure applying mechanism includes the spring pressure adjusting collar 64. The collar 64 has an internal screw threaded opening 65 which also has the first diameter, and is adapted to cooperate with the external threads 61 of the bolt 62. It has a main body shaft 65 and an upper head 66, the head 66 having a plurality of blind bores 67 formed therein for engagement by a tool to allow rotation of the adjustor collar 64. The coil spring 34 is centered by extending around the shaft portion 65 of the collar 64.

On the opposite end of the coil spring 34 from the adjusting collar 64 is the spring positioning plate 56. The spring positioning plate 56 also has an internal screw threaded opening 68 (see FIG. 10) therein, the opening 68 having a second diameter less than the first diameter. Note that there preferably is a tubular extension 69 from the bottom of the plate 56 which allows a sufficient length of thread to be provided to perform the necessary functions according to the invention.

While another type of spring locating mechanism can be formed associated with the plate 56, in the preferred embodiment of the invention a spring button 70 is provided. The spring button 70 has a smooth faced internal opening 71 therein at least of the same diameter as the second diameter 68 (preferably slightly larger), and it has a central post 72 which is adapted to be received within the coils of the spring 34 to center the spring 34. It also has a head 73 having a rounded bottom 74, the rounded bottom 74 engaging the top surface of the plate 56 and pivotal with respect thereto to facilitate proper location of the spring 34 during use.

The adjustment means also comprises a second bolt 76 (see FIG. 10) having screw threaded portions 77 thereof of the second diameter to engage the internal screw threaded opening 68 of the plate 56. Note that the bolt 76 is much longer than the bolt 62. The bolt 62 need have a length only sufficient to attach the collar 64 tightly to the under surface 78 of the stationary flange 58. That is it has a length less than the distance from flange 58 to the bottom of the coil spring 34 in a normal position thereof. The bolt 76, on the other hand, must have a length sufficient so that when the head 79 thereof is in engagement with the top face of the flange 58 threads 77 will engage the internal threads 68 and the plate 56.

Since two different bolts 62, 76 are necessary to provide maximum functionality of the device 10 according to the invention, it is desirable to be able to position those bolts on the frame so that they will easily be found. This is most readily accomplished by providing—see FIGS. 3 and 4—the nuts 80, 81 welded on an inner lip of the base 11. The nut 80 has the same internal thread and diameter as the external thread 77 of the bolt 76, while the nut 81 has the same internal thread and diameter as the external thread 61 of the nut 62. Whichever bolt 62, 76 is not being used is placed into operative association with its cooperating respective nut 80, 81.

Exemplary apparatus according to the invention having been described, an exemplary use thereof will now be set forth.

Figure 2:
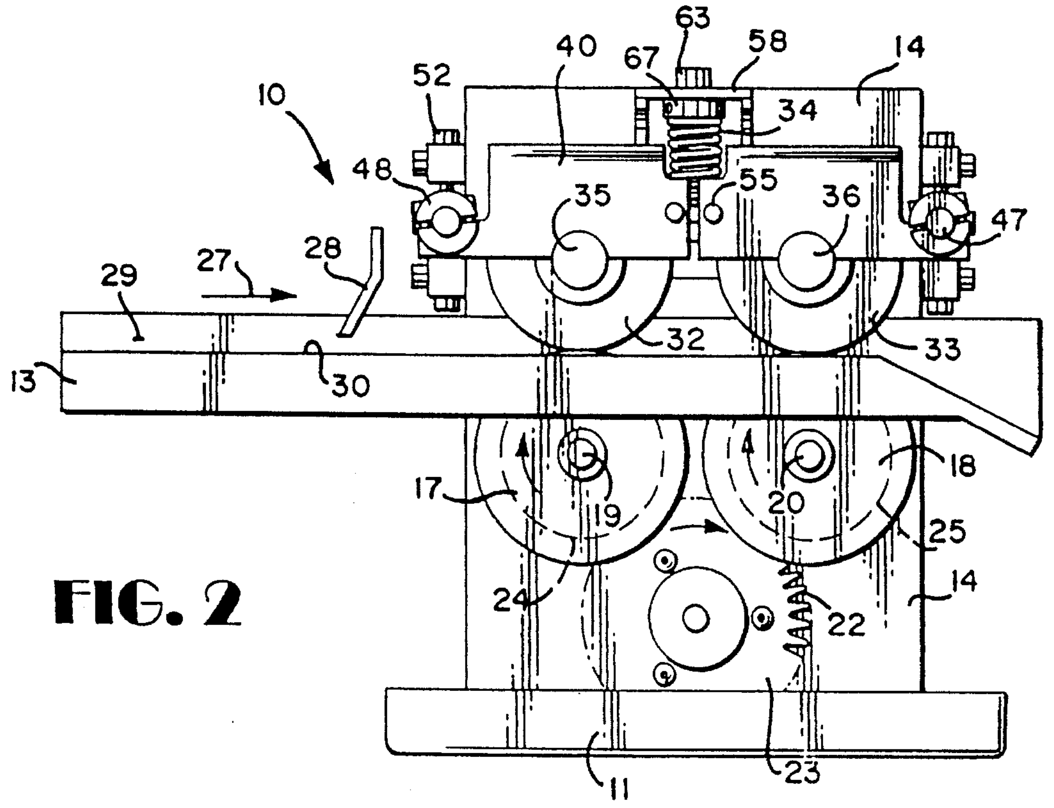
FIG. 2 is a front view like that of FIG. 1 with cosmetic housing and support components removed for clarity of illustration.
Figure 3:
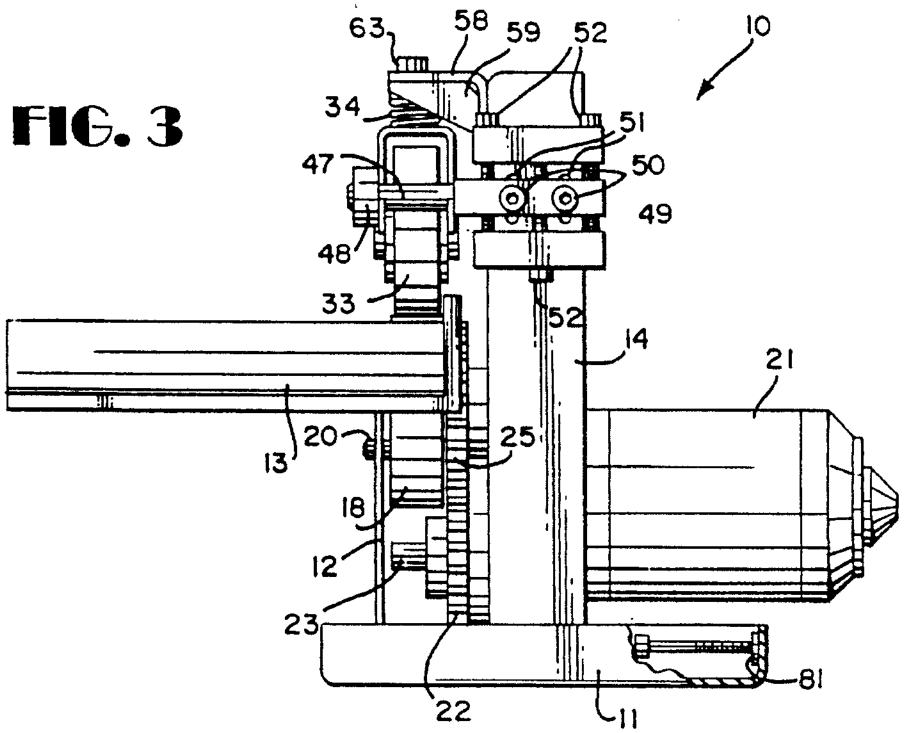
FIG. 3 is a side view of the device of FIG. 2 only with the bottom sheet metal mounting structure in place.
Figure 4:
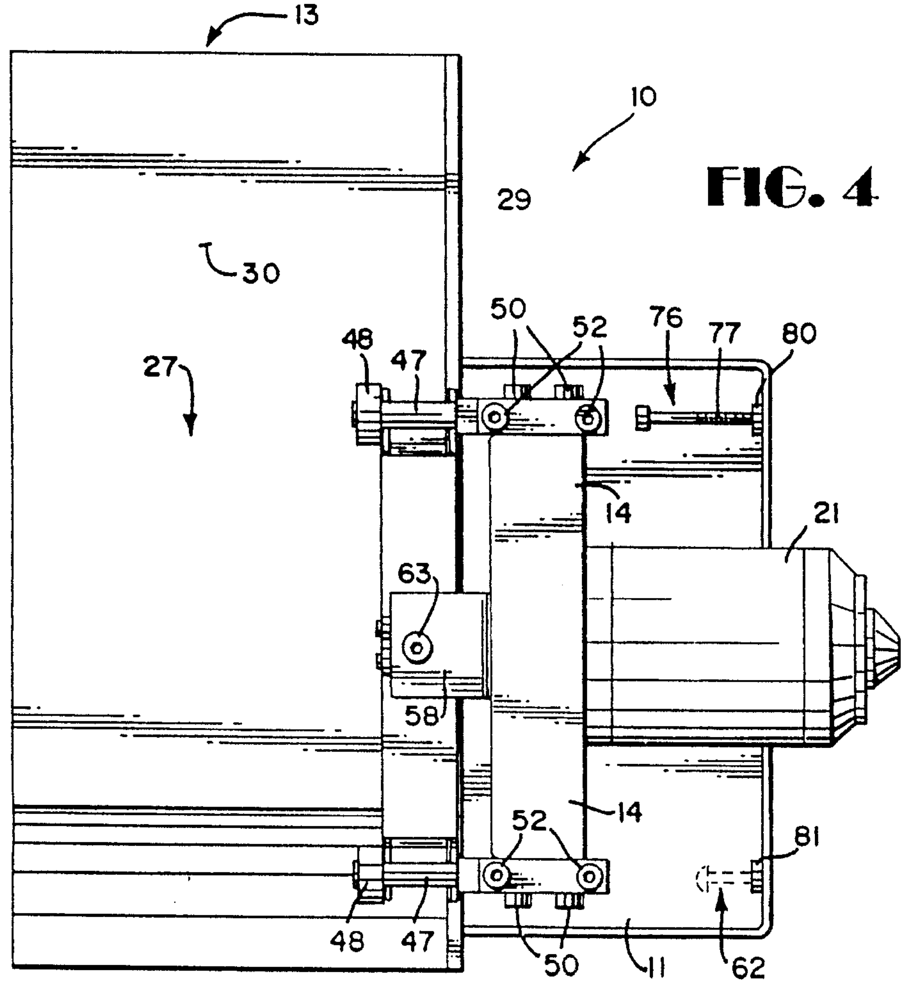
FIG. 4 is a top plan view of the machine of FIGS. 2 and 3.

The motor 21 rotates the gear 22, which in turn rotates the gears 17 and 18 in the direction illustrated in FIG. 2, to drive the first and second rollers 17, 18. The spring 34, acting between the adjusting collar 64 and the plate 56—which engages the pins 55—biases the rollers 32, 33 into tangential contact with the tops of the rollers 17, 18. An operator grabs a business form, pushes an unsealed longitudinal edge thereof against the upright portion 29 of the frame component 13 while laying the form on the platform surface 30, and manually pushes the form in the direction of arrow 27 toward the first roller 17. The flap 28 prevents the operator from moving his fingers into engagement with the rollers. When the form is grasped by the roller 17, at the nip between it and the third roller 32, it is conveyed in the direction 27, and the spring pressure provided by the spring 34 between the rollers 17, 32 and rollers 18, 33 effects pressure sealing of the glue strip at that edge of the business form. Thus the pressure sensitive glue therein is completely sealed. This technique is repeated for each other edge of the form that requires sealing, once the form has been moved into contact with the rollers 17, it being conveyed entirely through the machine 10 by the rollers 17, 18, and discharged past the rollers 18, 33.

If it is desirable to adjust the pressure applied by the spring 34, one merely sticks an appropriately sized tool in an opening 67 (typically four openings are provided around the periphery of the head 66 of the adjusting collar 64) which moves the adjusting collar 64 on the external shaft 61 of the first bolt 62 either downwardly toward the plate 56, or upwardly toward the underside 78 of the flange 58. The bolt 62 stays in the position it has been moved with respect to the flange 58 since the thread 61 thereof engages the internal thread of the opening 60 in the flange 58, the head 63 engaging the upper surface of the flange 58.

If it is desired to replace the rollers 32, 33, or to gain access to many of the machine components for maintenance (e.g. cleaning or repair), the spring pressure must first be relieved. This is accomplished by unscrewing the first bolt 62 completely from the flange 58 and adaptor 64, and then sticking the second, thinner, longer bolt 76 into the opening 60, through the adaptor 64, spring 34, and internal passage 71 in button 70, into engagement with the interiorly threaded opening 68 of the spring positioning plate 56. The second bolt 76 is tightened down into opening 68, and as it is tightened it draws the spring plate 56 closer to it.

As the plate 56 draws closer to the head 79 of the second bolt 76, it finally gets to the point where it no longer presses down on the pins 55 of the yokes 40, and finally when the spring 34 is essentially completely compressed (see FIG. 8), the pins 55 will no longer engage the plate 56, therefore the yokes 40 may be pivoted about their pivot axes defined by the shafts 47—as illustrated in FIG. 8—so that they are moved away from the machine, including the rollers 32, 33 which may be readily detached from the yokes 40 (as illustrated on the right hand side in FIG. 8). After maintenance or replacement, the yokes 40 are placed back in the positions illustrated in FIGS. 2 through 4, the bolt 76 is loosened causing the plate 56 to apply a spring pressure to the pins 55, the bolt 76 is removed and replaced with the first bolt 62, and the machine 10 is again ready for operation.

It will thus be seen that according to the present invention a method and apparatus are provided which effect an advantageous action upon business forms to effect sealing of pressure sensitive adhesive strips thereon. However the device seals only along the adhesive strips, having narrow rollers which little overlap the adhesive strips, so that no other parts of the form are adversely affected.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A pressure applying apparatus for applying pressure to business forms to activate pressure sensitive adhesive associated with the forms to seal one part of the form to another, comprising:

a frame;

conveying means for conveying a business form past said frame, said conveying means consisting essentially of a first narrow width roller rotatable about a first horizontal axis; a second roller narrow width rotatable about a second horizontal axis horizontally spaced from the first axis; a drive motor; and gearing means interconnecting said drive motor to said first and second rollers; and pressure applying means for applying pressure to said business forms when being conveyed in a first direction along a line tangent to both said first and second rollers, said pressure applying means comprising third and fourth narrow width rollers rotatable about third and fourth axes parallel to and aligned with said first and second axes, respectively, and means for biasing said third and fourth rollers toward contact with said first and second rollers so that as a business form is conveyed by said first and second rollers pressure is applied thereto by third and fourth rollers;

said biasing means comprising spring biasing means for applying spring pressure to both of said third and fourth rollers, and including: a stationary flange mounted on said frame and having a screw threaded opening therein of a first diameter; a spring pressure adjusting collar having a screw threaded opening therein of said first diameter; a coil spring; and a spring positioning plate; said spring pressure adjusting collar disposed on the underside of said flange with said screw threaded openings therein in alignment; said spring engaging said adjusting collar at one end thereof, and operatively engaging said plate at the other end thereof; and a first bolt having external screws with said first diameter and having a length less than the length from said flange to said plate when said spring is in extended position; said spring biasing said plate into operative engagement with said third and fourth rollers to apply a spring pressure thereto.

2. Apparatus as recited in claim 1 wherein said gearing means comprises an integral gear with each of said first and second rollers, and a driving pinion connected to said driving motor and engaging each of said gears attached to said first and second rollers.

3. Apparatus as recited in claim 2 wherein said gearing means consists of said pinion gear and said first and second gears integral with said first and second rollers, respectively.

4. An apparatus as recited in claim 2 wherein said gears are constructed from a material consisting essentially of non-ferrous metal and plastic components having good strength, and lubricity properties.

5. A method as recited in claim 2 wherein said biasing means comprise spring biasing means for applying spring pressure to both of said third and fourth rollers.

6. Apparatus as recited in claim 1 wherein said third and fourth rollers each comprise a standard ball bearing.

7. Apparatus as recited in claim 1 wherein said frame includes a substantially horizontal guide surface leading to the uppermost periphery of said first roller to the area between said first and third rollers.

8. Apparatus as recited in claim 7 wherein said second roller has a diameter enough larger than the diameter of said first roller to effect pull-up of a business form feeding from said first roller to said second roller.

9. Apparatus as recited in claim 7 further comprising a flap disposed in operative association with said frame platform, disposed prior to said first and third rollers, for preventing an operator's fingers coming into the dangerous high pressure area between the rollers.

10. Apparatus as recited in claim 1 wherein said spring positioning plate has a screw threaded opening therein having a second diameter, smaller than said first diameter; and wherein said spring biasing means further comprises a second bolt, interchangeable with said first bolt, and having external threads thereon of said second diameter, and having a length greater than the length from said flange to said plate when said spring is in extended position.

11. Apparatus as recited in claim 10 further comprising roller yokes for said third and fourth rollers, each roller yoke operatively attaching a roller to said frame for rotation about its axis and for relative movement toward and away from said first and second rollers, and each roller yoke having means for engaging said spring positioning plate so that the bias of said coil spring is applied to said third and fourth rollers through said spring positioning plate and said roller yokes.

12. Apparatus as recited in claim 11 wherein each of said roller yokes are releasably pivotally mounted to said frame about its own yoke axis so that when said second bolt is fully threaded into said spring positioning plate, said spring is compressed so that said roller yoke may be pivoted about its yoke axis and disconnected from said frame, but when said first bolt is in operative association with said flange the pressure of said spring prevents said yokes from being significantly pivotally movable about said yoke axes.

13. Apparatus as recited in claim 12 wherein said yokes are connected to said frame by yoke pins which define said yoke axes; and further comprising means for detachably mounting said yoke pins to said frame; and further comprising nuts attached to said frame for receipt of said first and second bolts, respectively, therein when the bolts are not in use.

14. Apparatus as recited in claim 10 further comprising a spring button having a through extending opening therein large enough to allow clear passage of said second bolt therethrough, a spring positioning central post, and a rounded head engaging said spring positioning plate; said coil spring engaging said head on the opposite side thereof from said plate, and surround said post, and operatively engaging said spring positioning plate through said head.

15. Apparatus as recited in claim 1 wherein said frame comprises a folded metal sheet for mounting said first and second rollers for rotation; a support for said third and fourth rollers, said biasing means, said first and second rollers, and for said motor; a lead-in platform to said first roller; and a safety and cosmetic outer enclosure.

16. Apparatus as recited in claim 1 wherein said narrow width first through fourth rollers have a width of less than about one inch, to effect perimeter sealing of a document by successive edge passes on each of the unsealed edges of the document.

17. Spring biasing means for applying a spring force between a stationary flange and one or more biased elements, said means comprising:

a screw threaded opening of a first diameter in said stationary flange; a spring pressure adjusting collar having a screw threaded opening therein of said first diameter; a coil spring; and a spring positioning plate; said spring pressure adjusting collar disposed on the underside of said flange with said screw threaded openings therein in alignment; said spring engaging said adjusting collar at one end thereof, and operatively engaging said plate at the other end thereof; and a first bolt having external screws with said first diameter and having a length less than the length from said flange to said plate when said spring is in extended position; said spring biasing said plate into operative engagement with said one or more elements to apply a spring pressure thereto; and wherein said spring positioning plate has a screw threaded opening therein having a second diameter, smaller than said first diameter; and wherein said spring biasing means further comprises a second bolt, interchangeable with said first bolt, and having external threads thereon of said second diameter, and having a length greater than the length from said flange to said plate when said spring is in extended position.

18. Apparatus as recited in claim 28 wherein said one or more elements comprise rollers, and roller yokes for said rollers, each roller yoke operatively attaching a roller to a frame to which said flange is attached for rotation about its axis and for relative movement toward and away from other elements, and each roller yoke having means for engaging said spring positioning plate so that the bias of said coil spring is applied to said rollers through said spring positioning plate and said roller yokes.

19. Apparatus as recited in claim 11 wherein each of said roller yokes are releasably pivotally mounted to said frame about its own yoke axis so that when said second bolt is fully threaded into said spring positioning plate, said spring is compressed so that said roller yoke may be pivoted about its yoke axis and disconnected from said frame, but when said first bolt is in operative association with said flange the pressure of said spring prevents said yokes from being significantly pivotally movable about said yoke axes.

20. Apparatus as recited in claim 17 further comprising a spring button having a through extending opening therein large enough to allow clear passage of said second bolt therethrough, a spring positioning central post, and a rounded head engaging said spring positioning plate; said coil spring also engaging said head on the opposite side thereof from said plate and receiving said post therein, and operatively engaging said spring positioning plate through said head.

21. Spring biasing means for applying a spring force between a stationary flange and one or more biased elements, said means comprising:

a screw threaded opening of a first diameter in said stationary flange; a sprint pressure adjusting collar having a screw threaded opening therein of said first diameter; a coil spring; and a spring positioning plate; said spring pressure adjusting collar disposed on the underside of said flange with said screw threaded openings therein in alignment; said spring engaging said adjusting collar at one end thereof, and operatively engaging said plate at the other end thereof; and a first bolt having external screws with said first diameter and having a length less than the length from said flange to said plate when said spring is in extended position; said spring biasing said plate into operative engagement with said one or more elements to apply a spring pressure thereto; and a spring button having a through extending opening therein large enough to allow clear passage of said second bolt therethrough, a spring positioning central post, and a rounded head engaging said spring positioning plate;

said coil spring also engaging said head on the opposite side thereof from said plate and receiving said post therein, and operatively engaging said spring positioning plate through said head.

22. A pressure applying apparatus for applying pressure to business forms to activate pressure sensitive adhesive associated with the forms to seal one part of the form to another, comprising:

a frame;

conveying means for conveying a business form past said frame, said conveying means consisting essentially of a first narrow width roller rotatable about a first horizontal axis; a second roller narrow width rotatable about a second horizontal axis horizontally spaced from the first axis; a drive motor; and gearing means interconnecting said drive motor to said first and second rollers;

pressure applying mean for applying pressure to said business forms when being conveyed in a first direction along a line tangent to both said first and second rollers, said pressure applying means comprising third and fourth narrow width rollers rotatable about third and fourth axes parallel to and aligned with said first and second axes, respectively, and means for biasing said third and fourth rollers toward contact with said first and second rollers so that as a business form is conveyed by said first and second rollers pressure is applied thereto by third and fourth rollers; and wherein said frame comprises a folded metal sheet for mounting said first and second rollers for rotation; a support for said third and fourth rollers, said biasing means, said first and second rollers, and for said motor; a lead-in platform to said first roller; and a safety and cosmetic outer enclosure.

* * * * *